356-153
Aug. 23, 1966   G. E. HOWE   3,267,794
OPTICAL ALIGNMENT SYSTEM FOR DETECTING AND
CORRECTING DISTORTION IN A STRUCTURE
Filed Jan. 16, 1961   3 Sheets-Sheet 1
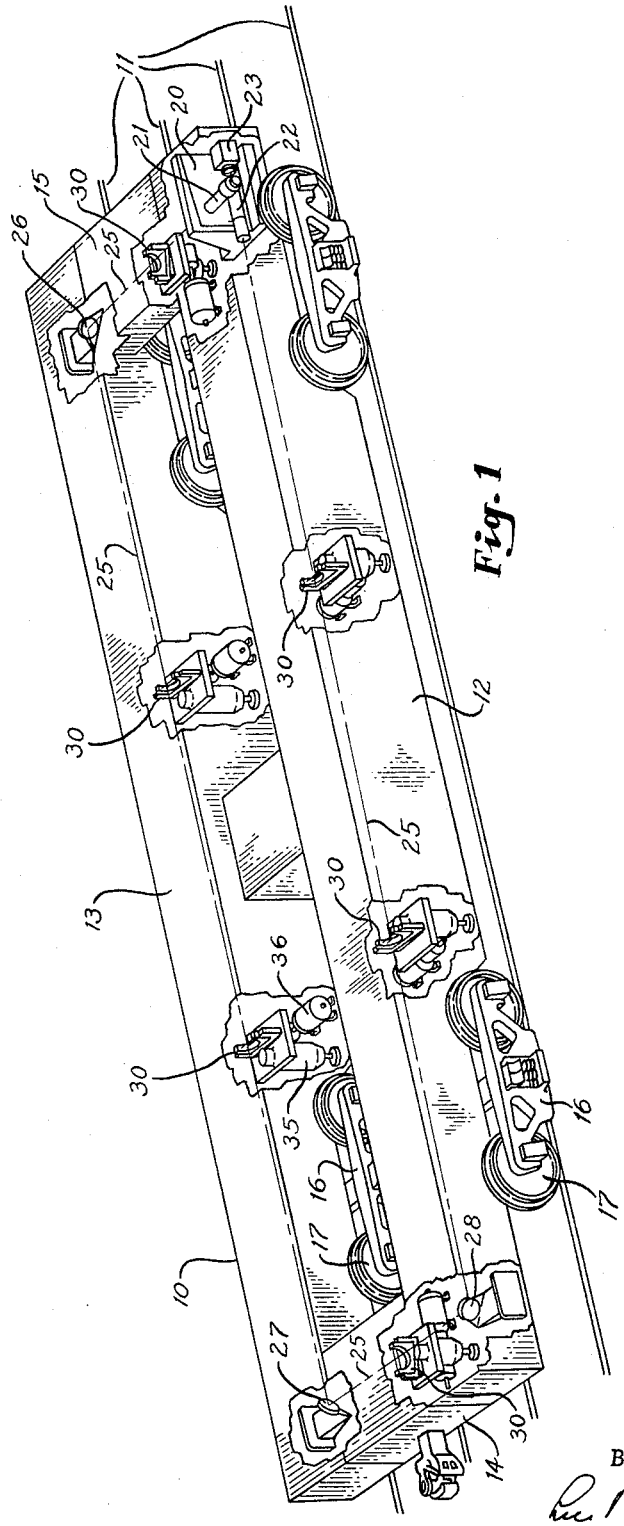
INVENTOR.
GEORGE E. HOWE
BY
*Lee R. Schermerhorn*
ATTORNEY

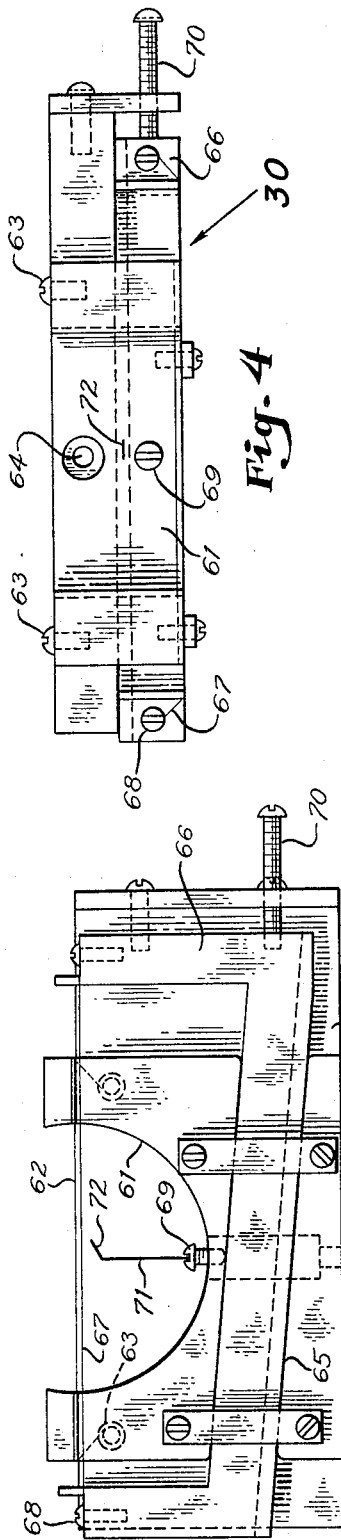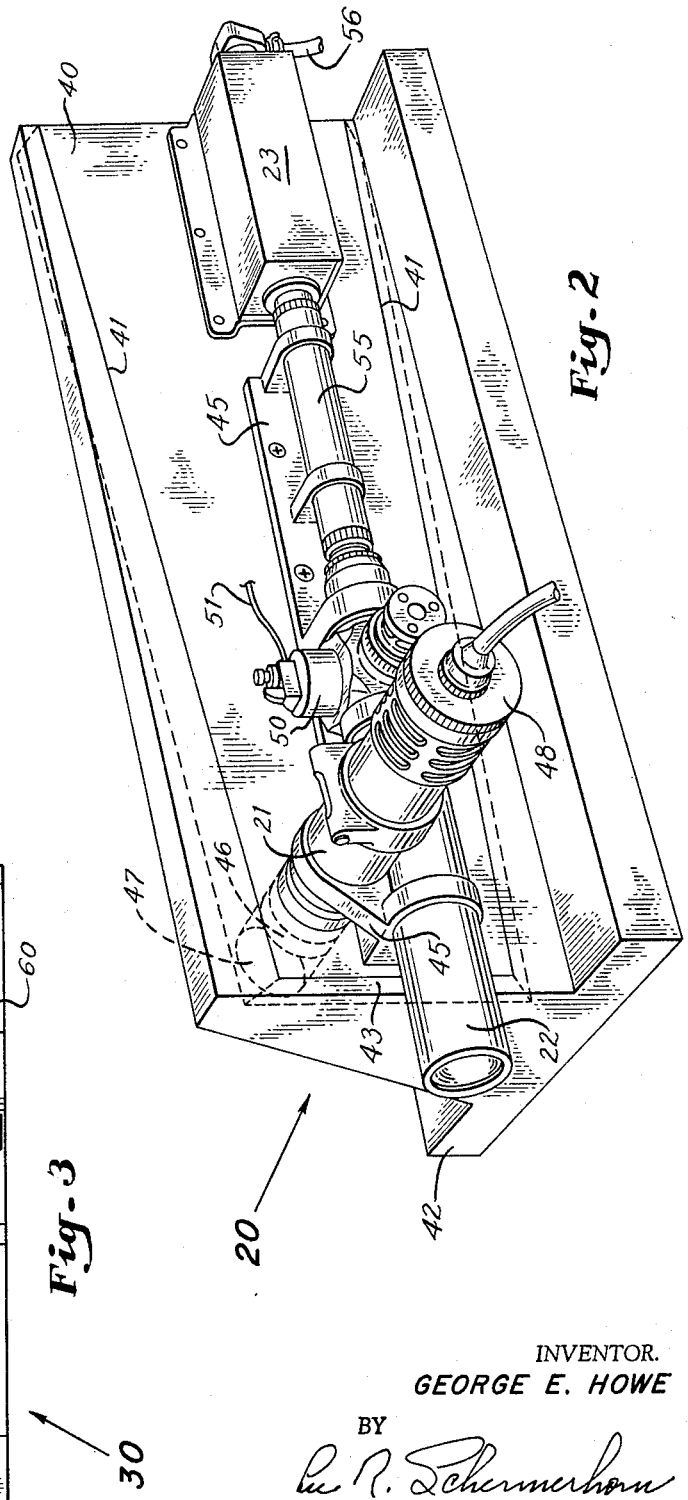

INVENTOR.
GEORGE E. HOWE 3,267,794
OPTICAL ALIGNMENT SYSTEM FOR DETECTING AND CORRECTING DISTORTION IN A STRUCTURE
George E. Howe, Pacoima, Calif., assignor to Guy F. Atkinson Company, San Francisco, Calif., a corporation of Nevada
Filed Jan. 16, 1961, Ser. No. 82,757
3 Claims. (Cl. 88—14)

This invention relates to an optical system for aligning points in a straight line or in a plurality of straight lines bearing some fixed relation to a reference body or structure which is capable of adjustment.

Although the present alignment system is of general application, it has its greatest advantage in connection with the use of remote control devices where human operators cannot be stationed at the points to be aligned because of inaccessibility, radiation hazard or some other prohibitive condition. The problem arises, for example, in connection with the operation and manipulation of ponderous equipment in a zone of radiation hazard. Movements of such equipment incidental to the functioning thereof may cause objectionable load deflections in the platform or supporting framework which must be corrected by realignment in order to maintain the degree of precision of alignment which is necessary for the functioning of the equipment. Remote indicating means capable of high precision and appropriate correcting means operable by remote control then become necessary. In such case the misalignment may involve only vertical deflection of supporting members but the invention is not limited to corrective adjustments for loading deflections.

The objects of the invention are, therefore, to provide an improved alignment system for indicating the departure of predetermined points from reference positions, to provide remote control means for correcting indicated departures, to provide an improved optical system for indicating misalignment and the effects of corrective efforts, to provide a system of the type described having a closed circuit television system for observing targets at said predetermined points while corrective adjustments are being made from a remote or shielded station, and to provide an improved optical target for such a system.

The present system utilizes a collimated beam of light aimed along a reference line or around an angular path, mirrors being employed in the latter case to reflect the light in a series of straight lines bounding the adjustment zone. Preferably, the mirrors are arranged to direct the light in a substantially closed circuit, either out and back in a single line of sight or in a polygonal course having a plurality of lines of sight, so that major components of the equipment may be combined in a single unit. In such cases, the single unit comprises a collimator and light source to project the light beam and a telescope equipped with cross hairs and focus drive motor to focus the telescope on different targets in the path of the light beam. The telescope then projects its image on the vidicon tube of a television camera also incorporated in the same unit whereby the image may be observed at a control console by closed circuit television.

The invention further includes an improved form of bifilar optical target mounted in the path of the light beam and in the line or lines of sight at critical points on the supporting platform or framework which is subject to deflection. Associated with each optical target is a remotely controlled jack for raising or lowering the supporting frame.

The control station is located in an area made safe by shielding or distance from the source of harmful radiation and comprises a console containing a television monitor and control switches for the light source, telescope focusing motor and jacks. Thus, the telescope may be focused on one target at a time and the observed deflection of the frame corrected by the jack at each target point without the necessity for the operator to enter the radiation zone or even have a direct view of the equipment under his control.

The foregoing and other objects and advantages will become apparent and the invention will be better understood from the following description of the preferred embodiment illustrated in the accompanying drawings. Various changes may be made, however, in the details and arrangement of parts and certain features may be employed without others. All such modifications within the scope of the appended claims are included in the invention.

In the drawings:

FIGURE 1 is a perspective view of a special car frame embodying the features of the invention;

FIGURE 2 is an enlarged perspective view of the collimator and telescope unit shown in FIGURE 1;

FIGURE 3 is a front elevation view of one of the bifilar optical targets shown in FIGURE 1;

FIGURE 4 is a top plan view of the target shown in FIGURE 3;

Figure 6:
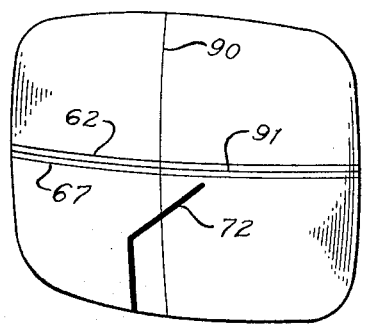
FIGURE 6 is an enlarged view of the television picture screen of the console showing the appearance of a target when it is in proper alignment.

In FIGURE 1 the numeral 10 designates the rectangular frame of a special car on a track having four rails 11. The car frame comprises a pair of hollow longitudinal box beams 12 and 13 and a pair of similar end cross beams 14 and 15. This frame is supported on four trucks 16, each truck having four wheels 17 to run on two of the rails 11.

The car frame 10 supports various units of extremely heavy equipment (not shown) which must be shifted relative to each other in the use of the equipment. This causes objectionable deflections to occur in the frame 10 since the frame is normally supported only at points adjacent to its ends by the trucks 16. When the frame is distorted the alignment of the equipment is disturbed requiring corrective adjustment by means of sensitive auxiliary devices and equally sensitive indicating devices. Human beings cannot, however, approach the car because of the radiation hazard. The heavy equipment causing the distortion is manipulated and operated by remote control through robot mechanisms and so also must the distortion indicating and correcting system be operated and controlled.

In one corner of the frame 10 there is mounted a removable collimator and telescope unit 20. This unit contains a collimator and light source 21, a telescope 22 and a television camera 23. The collimator and light source 21 projects a beam of light 25 through the hollow frame member 15 toward a mirror 26 at the adjacent corner of the frame. From the mirror 26 the beam 25 is reflected to mirror 27 at the next corner and thence to mirror 28 at the third corner and back to telescope 22 which is associated with the vidicon tube of television camera 23.

In its circuit around the frame 10, the light beam 25 passes successively through a series of bifilar optical targets 30 located at critical points where beam deflection must be corrected in order to maintain the frame 10 in a true plane. The telescope 22 may be focused on any particular one of these targets so that the image of the selected target is projected into the television camera. When the quipment on the car is in use, the car is stationary on tracks 11 and the various structural beams of the frame 10 are supported at each target point by a retractable jack 35 driven by a reversible electric motor 36 or other suitable remotely controlled means. When the frame 10 sags under any particular target, the leg of the corresponding jack may be lowered to bear against a suitable supporting surface providing firm bearing, such as a concrete base or heavy steel pads.

For convenience in illustrating and explaining the principles of the invention, it will be assumed that the targets 30 are in the transverse centers of the respective beams and that the jacks 35 are directly under the targets whereby the jack legs would engage a supporting base between two of the rails 11 since the trucks 16 straddle the longitudinal beams 12 and 13 and have wheels on opposite sides thereof. It will be appreciated that the car frame may be constructed differently whereby the jack legs might be brought to bear directly on the rails 11 but, in any case, it is preferable to mount the jacks under the targets in such a way that the lifting force applied by each jack will correct the beam deflection without introducing torsional strains in the beam and so that the upward displacement of the target will correspond to the lifting movement applied by the jack.

It will be apparent then that the light beam 25 travels in straight lines from mirror to mirror around the perimeter of the frame whereby any vertical displacement of the targets 30 will be projected into the television camera 23 and the jacks can be applied at the sagging points to remove the deflection in the frame at each point and bring that point back into the original plane. It will further be apparent that it is not necessary for the four legs of the light beam circuit to lie in a common plane; the axis of the collimator and light source 21 may be a distance above the level of the axis of telescope 22, as shown. It is only necessary that the collimator and telescope remain in fixed relationship with each other and that the targets 30 be adjusted at the time of installation into positions of vertical alignment as viewed through the telescope when the frame 10 is disposed in a true plane.

The light beam will then provide a reference line for bringing all target points on the frame into a common plane even though the light beam is inclined from the desired plane of the frame as it drops during the course of its travel from the level of collimator and light source 21 to the level of telescope 22. It is, of course, within the scope of the invention to provide special equipment causing the axis of collimator and light source 21 to intersect the axis of telescope 22 and the same effect may be produced, if desired, by merely mounting the collimator and light source 21 on the extended axis of the telescope either behind the television camera or in front of the telescope tube.

Further details of the components of the system will now be described.

Details of the collimator and telescope unit are shown in FIGURE 2. This equipment is attached to a longitudinally tapered plate 40 having bevelled upper and lower edges 41 to fit a mating dovetail groove in a base member 42 which is mounted in one end of longitudinal beam 12 at a corner of the frame 10. Plate 40 is removable by sliding it to the right out of the base member 42. When plate 40 is inserted in the dovetail groove, it slides to the left until it seats against an end wall 43 in the base member whereby the plate 40 and the components carried thereby are accurately positioned and located with respect to the mirrors and targets. Suitable means, not shown, are provided for holding the plate 40 in the base member.

A block 45 on plate 40 is equipped with clamp rings for supporting the telescope 22 longitudinally of the plate and the collimator 21 perpendicular to the plate and telescope, as shown. Plate 40 and base member 42 are provided with aligned openings 46 and 47 for the passage of light from the collimator. Collimator 21 is of conventional construction comprising a tube having a lens combination arranged to project a beam of light of parallel rays at the mirror 26 and thence in the lines 25 for mirrors 27 and 28 back to the telescope 22. The source of light is an electric bulb in a lamp house 48 on the rear end of the collimator tube.

Telescope 22 is equipped with a reversible electric focus drive motor 50 energized through a control cable 51. By means of this adjustment the telescope may be focused on one after another of the targets 30 to cause the image of the selected target to be projected into the television camera 23 mounted on the rear end of plate 40. The television camera preferably has its lens removed so that the target image is focused directly on the vidicon tube of the camera by the telescope lenses. A conventional telescope may be used for this purpose by interposing a tube 55 between the eyepiece end of the telescope and the lens opening of the camera. Tube 55 is mounted in suitable clamp rings or the like on the mounting block 45. The picture or target image seen by the camera is then transmitted over a closed circuit through an electric cable 56 which also includes the other necessary camera circuits.

One of the bifilar target 30 is illustrated in FIGURES 3 and 4. A frame 60 is provided with a semicircular recess or opening 61 in its upper side. Across a diameter of this opening there is stretched a stationary horizontal cross hair or wire 62 which has its ends anchored on screws 63 on the back side of frame 60. A bottom rear portion of frame 60 is equipped with a hole 64 for a screw for mounting the frame in upright transverse position in the beams 12, 13, 14 and 15 as shown in FIGURE 1, with the wire 62 horizontal and perpendicular to the light beam or line of sight 25. Line 25 may be considered as representing both the light beam from light source 48 and the line of sight from telescope 22. The bases of target frames 60 are supported on shims (not shown) to adjust each wire 62 vertically to the line of sight when the frame 10 is disposed in a true plane at the time of installation of the targets 30.

On the front side of each target frame 60 as viewed in FIGURE 3, there is an inclined guideway 65 slidably supporting a movable U-shaped frame 66. The ends of frame 66 comprise the pair of upright legs supporting a second horizontal cross hair or wire 67 which is stretched between a pair of screws 68 in the top ends of the legs. Wire 67 is parallel with wire 62 and in the same vertical plane. By sliding the movable frame 66 to the left or right the lower wire 67 may be raised or lowered to vary the vertical spacing between the two wires. The desired adjustment is maintained by a screw 70 which is threaded through one end of the frame 60 to engage the movable frame 66. A setscrew 69 in the frame 60 clamps the two frames together against relative movement.

The optimum vertical spacing between wires 62 and 67 varies with the distance of the target from the telescope and the magnifying power of the telescope and these variables are in turn related to the degree of precision required. The telescope is equipped with a horizontal cross hair which appears intermediate the wires 62 and 67 when frame 10 is properly adjusted to a plane. At the time of installation of the optical system, the top wire 62 is adjusted by shims under the base frame 60 and the bottom wire 67 is adjusted relative thereto by screw 70 to give the best alignment indication on the television picture tube.

It is necessary further to provide some means for identifying each target 30 and distinguishing it from the other targets in the line of sight so that the operator will know which one of the jacks 35 requires adjustment. This indicium is provided by a vertical wire 71 on the stationary frame 60. Wire 71 has a bent semaphore end 72 which may be inclined in different positions according to a code to identify the target. Thus the semaphore end 72 is bent in the direction of the hour hand of a clock at one o'clock to indicate target number 1, in the direction of two o'clock for target number 2, and so on. The target wires 62 and 67 and the slender semaphore indicium 72 do not obstruct the light beam nor the line of sight in the case of all targets which are out of focus in the telescope. The targets are a sufficient distance apart that when the telescope is focused on a particular target the other targets disappear and do not cause confusion or appreciably reduce the light intensity. This is a lens phenomenon which is well known to the users of telescopes.

Figure 5:
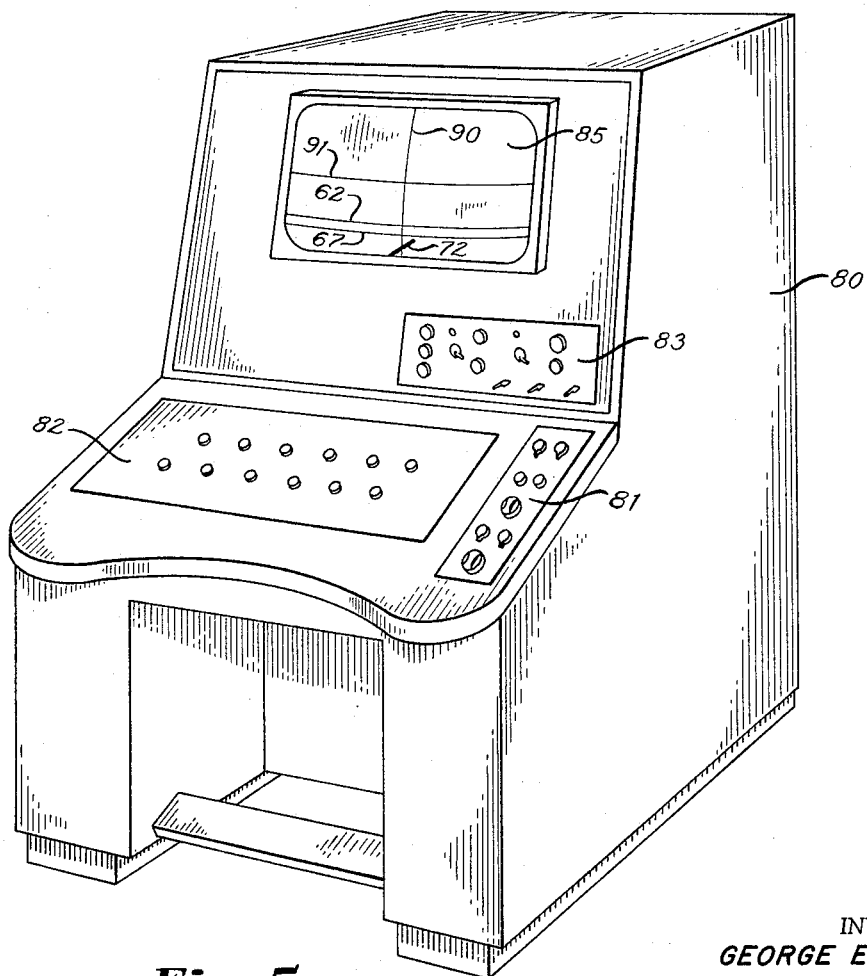
FIGURE 5 is a perspective view of the operator's console.

FIGURE 5 shows the console 80 which is connected by electric circuits with the television camera 23, the telescope focusing motor 50, light source 48, and jack motors 36. The console is equipped with a control board 81 having control instrumentalities for the television camera, collimator light source, and telescope focusing motor 50. A second control board 82 is equipped with switches for raising and lowering the jacks 35. A third control board 83 operates the closed circuit television receiver which has a picture tube 85 mounted just above the various control boards as shown. By observing the image on this picture tube the operator may focus the telescope 22 by remote control and obtain the same view of any selected target 30 that he would get if he placed his eye directly at the eyepiece of the telescope. The target image on the picture tube 85 thereby indicates which target is in view and whether any part of the frame 10 requires upward or downward adjustment to restore the frame to a true plane. Moreover, the operator can observe the effect of such adjustment as it is being made, and, when the adjustment is completed at one point, he can shift his focus to a different target and adjust that point, and so on around the frame.

In FIGURE 5 the usual vertical and horizontal cross hairs of the telescope appear at 90 and 91. Semaphore 72 indicates by its two o'clock direction that target number two is being observed. The depressed position of target wires 62 and 67 below cross hair 91 indicates that frame 10 is deflected downward at this target. The operator then actuates the corresponding jack 35 until target wire 62 rises above cross hair 91. When the cross hair is midway between the target wires as shown in FIGURE 6, the jack is stopped. Then the operator shifts the telescope focus to another target and repeats the process. It will be appreciated that the adjustment process is normally a reiterative readjustment procedure. The motion of any one jack on an elastic structure or an elastically supported structure will require some readjustment of the other support points if there is not to be a general shift of attitude. When all the target wires appear as shown in FIGURE 6, the load deflection has been corrected at all critical points in the frame 10 and the frame has been restored to a true plane.

Each mirror may also serve as a target, if desired, by providing it with a pair of horizontal lines to serve the same purpose as target wires 62 and 67. In such case the frame 10 would be equipped with a jack 35 under each target mirror.

While the system just described provides only for vertical displacement correction, it will be apparent to persons skilled in the art that the principles of the invention may also be applied with advantage to corrective systems for horizontal or rotational displacements. Moreover, such additional displacement systems may be combined when desired. In all such systems the corrective devices, such as the present jacks, need not necessarily always be applied to the target points although this arrangement usually facilitates the adjustment procedure.

Having now described my invention and in what manner the same may be used, what I claim as new and desire to protect by Letters Patent is:

1. Apparatus for correcting distortion in a structure comprising an optical alignment system having optical targets mounted on the structure one behind another in a single line of sight, a telescope for viewing said targets, a television camera receiving a target image through said telescope, a control station having a television receiver connected with said camera, means in said station for focusing said telescope on each of said targets, means for identifying said targets as viewed in said receiver, means for applying a distortion corrective force to the structure at a plurality of points, and means in said station for controlling said corrective means.

2. Apparatus for correcting distortion in a structure comprising an optical unit mounted on said structure, said unit comprising a light source, telescope and television camera, mirrors on said structure establishing a closed polygonal light path from said light source to said telescope and camera, optical targets on said structure one behind another in said light path, means for applying a distortion correcting force to said structure at a plurality of points, a control station having a television receiver for viewing the target images through said camera, means for identifying said targets as viewed in said receiver, and means in said station controlling said corrective means.

3. In an optical alignment system for a structure, mirrors on said structure establishing a closed polygonal light path, optical targets on said structure, one behind another in said light path; an optical unit comprising a base plate adapted for precise removable mounting on said structure, a collimator tube and light source positioned on said plate to project a beam of light in one direction around said polygonal light path, a telescope positioned on said plate to receive said beam of light after the light has made a complete circuit around said path, a focus drive motor connected with said telescope to focus the telescope on each of said targets, and a television camera mounted on said plate to receive a target image through said telescope.

References Cited by the Examiner

UNITED STATES PATENTS

| | | | |
|---|---|---|---|
| 1,660,833 | 2/1928 | Cronjaeger | 33—74 |
| 2,198,837 | 4/1940 | Morgan. | |
| 2,381,199 | 8/1945 | Baker | 212—145 |
| 2,549,669 | 4/1951 | Cuny | 88—14 |
| 2,563,780 | 8/1951 | Fontaine | 88—14 |
| 2,577,807 | 12/1951 | Pryor | 88—2.2 |
| 2,594,382 | 4/1952 | Bedford. | |
| 2,703,505 | 3/1955 | Senn. | |
| 2,705,375 | 4/1955 | Foreman et al. | |
| 2,855,111 | 10/1958 | McIntyre | 212—145 |
| 2,904,890 | 9/1959 | Vajda | 33—74 |
| 2,950,340 | 8/1960 | Compton et al. | 178—6 |
| 2,978,950 | 4/1961 | Mandler | 88—14 |
| 3,035,713 | 5/1962 | Iserman | 212—145 |
| 3,101,175 | 8/1963 | Brown | 178—6 X |

FOREIGN PATENTS

| | | |
|---|---|---|
| 1,190,357 | 3/1959 | France. |
| 1,041,264 | 10/1958 | Germany. |

OTHER REFERENCES

Checking Aircraft Assembling Jigs by Optical-Mechanical Means. Machinery, Jan., 1945, pp. 171–176.

JEWELL H. PEDERSEN, *Primary Examiner.*

E. G. ANDERSON, *Examiner.*

T. L. HUDSON, *Assistant Examiner.*